United States Patent [19]

Ng et al.

[11] Patent Number: 5,222,076
[45] Date of Patent: Jun. 22, 1993

[54] DATA COMMUNICATION APPARATUS AND METHOD WITH LOW POWER STANDBY MODE

[76] Inventors: William K. Y. Ng, 1166 East 10th Avenue, Vancouver, British Columbia, Canada, V5T 2B7; Alfred G. Johanson, #103, 1537 Burnaby St., Vancouver, British Columbia, Canada, V6G 1X1

[21] Appl. No.: 726,228

[22] Filed: Jul. 5, 1991

Related U.S. Application Data

[62] Division of Ser. No. 366,444, Jun. 15, 1989, Pat. No. 4,929,057.

[51] Int. Cl.⁵ .................. H04B 1/44; H04L 27/10
[52] U.S. Cl. ........................... 375/9; 375/45; 455/78
[58] Field of Search .............. 375/7, 9, 45, 62, 88, 375/8, 121, 76; 455/31.1, 73, 78

[56] References Cited

U.S. PATENT DOCUMENTS

| | | | |
|---|---|---|---|
| 2,807,016 | 9/1938 | Gloess | 342/142 |
| 3,166,732 | 1/1965 | Ljungman et al. | 340/972.2 |
| 3,373,856 | 3/1968 | Kusters et al. | 194/318 |
| 3,535,870 | 10/1970 | Mitchell | 368/6 |
| 3,909,826 | 9/1975 | Schildmeier et al. | 375/7 |
| 3,999,372 | 12/1976 | Welch et al. | 194/225 |
| 4,249,648 | 2/1981 | Meyer | 194/212 |
| 4,275,272 | 6/1981 | Mennino, Jr. et al. | 379/112 |
| 4,310,890 | 1/1982 | Trehn et al. | 364/467 |
| 4,356,903 | 11/1982 | Lemelson et al. | 194/217 |
| 4,460,080 | 7/1984 | Howard | 194/317 |
| 4,483,431 | 11/1984 | Pratt | 194/317 |
| 4,576,273 | 3/1986 | Milnes | 194/209 |
| 4,823,928 | 4/1989 | Speas | 194/217 |
| 5,063,612 | 11/1991 | McKeown | 455/343 |

FOREIGN PATENT DOCUMENTS 2062993 5/1981 United Kingdom ............ 375/9

Primary Examiner—Curtis Kuntz
Assistant Examiner—Young Tse
Attorney, Agent, or Firm—Bull, Housser & Tupper

[57] ABSTRACT

An apparatus and method for communication of data, the apparatus including a transmitter operable to transmit a first signal at a first frequency and a second signal at a second frequency. The second signal is modulated to represent data and the transmitter ends transmission of the second signal when the transmission of data is completed. The apparatus further includes a receiver switchable between a first frequency receive mode and a second frequency receive mode, the first frequency receive mode rendering the receiver operable to receive signals at the first frequency and the second frequency receive mode rendering the receiver operable to receive signals at the second frequency. The first frequency receive mode is a low power mode and the second frequency receive mode is a data communication mode. The apparatus also includes a device for switching the receiver into the low power mode, for switching the receiver into the data communication mode when said first signal is received, and for switching the receiver into the low power mode when transmission of said second signal is ended.

14 Claims, 7 Drawing Sheets

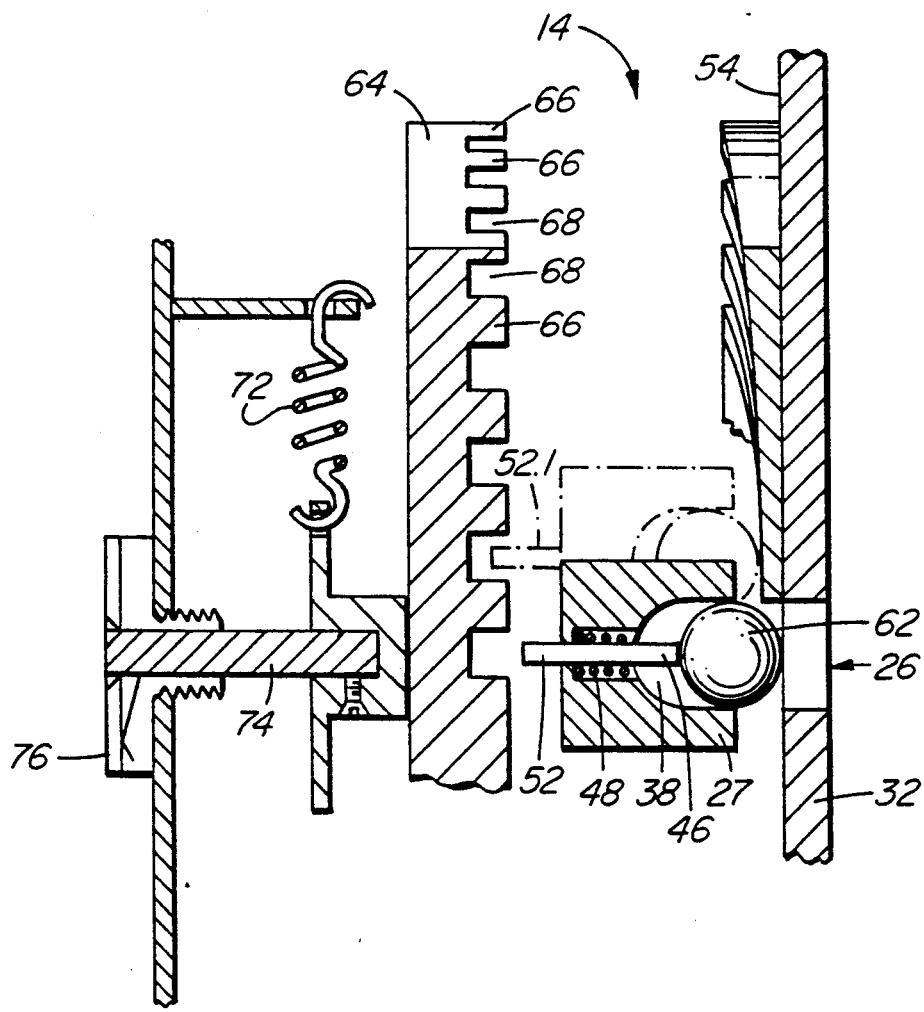
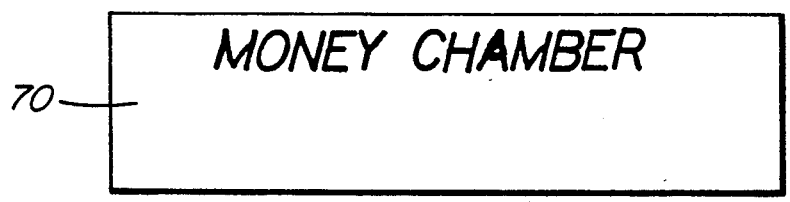
FIG. 3

| | | |
|---|---|---|
| 122 — | RTC | YEAR<br>MONTH<br>DAY<br>HOUR<br>MINUTE<br>SECOND |
| 124 — | RATES | RATE 1<br>RATE 2<br>RATE 3<br>EFFECTIVE TIMES<br>LDV<br>RATE POINTER<br>MAXIMUM TIME INTERVAL |
| 126 — | PORT A | DATA |
| 128 — | PORT B | DATA |
| 130 — | PARKING TIME CLOCK | HOUR<br>MINUTE<br>SECOND<br>1/25 SEC. |
| 132 — | NON-RESETTABLE GRAND TOTAL | DOLLARS |
| 134 — | HOURLY REPORT | DAYS<br>HOUR INTERVALS<br>DAY POINTER<br>HOUR POINTER<br>START HOUR |
| 136 — | NON-ACTIVE ACCUMULATORS | DAYS (TOTAL LDV/DAY)<br>HOURS |
| 138 — | Z REPORT STATUS | MONTH<br>DAY<br>COUNTER |
| 140 — | MONEY REGISTER | MONEY CODE |
| 142 — | COIN ACCUMULATION | 5<br>10<br>25 |
| 144 — | NEGATIVE TIME | MINUTES |

FIG. 5

```
┌─────────────────────────────────────────────────┐
│ TIME CATEGORY                                   │~152
├─────────────────────────────────────────────────┤
│                                                 │
│ UPDATE RATE POINTER                             │
│ UPDATE HOURLY REPORT POINTERS                   │
│ UPDATE NON-ACTIVE HOUR DAY REGISTER             │
│ UPDATE NON-ACTIVE CONSECUTIVE HOUR REGISTER     │
│                                                 │
└─────────────────────────────────────────────────┘
```

FIG. 7

```
┌─────────────────────────────────────────────────┐
│ COIN CATEGORY                                   │~154
├─────────────────────────────────────────────────┤
│                                                 │
│ COMPARE COIN TO LAST COIN                       │
│ STORE COIN CODE                                 │
│ UPDATE COIN ACCUMULATOR                         │
│ UPDATE NON-RESETTABLE GRAND TOTAL REGISTERS     │
│ UPDATE PARKING TIME CLOCK REGISTERS             │
│ UPDATE HOURLY REPORT REGISTER                   │
│                                                 │
└─────────────────────────────────────────────────┘
```

FIG. 8

```
┌─────────────────────────────────────┐
│ COMMUNICATIONS CATEGORY             │~158
├─────────────────────────────────────┤
│ READ PORT B                         │
│      INTERPRET CONTROL CODE         │
│           READ ROUTINE              │
│             WRITE ROUTINE           │
│ UPDATE REPORT STATUS                │
└─────────────────────────────────────┘
```

FIG. 9

DATA COMMUNICATION APPARATUS AND METHOD WITH LOW POWER STANDBY MODE

This is a division of application Ser. No. 07/366,444, filed Jun. 15, 1989 now U.S. Pat. No. 4,929,057.

CROSS REFERENCES TO RELATED APPLICATIONS

This is a divisional application continuing from application Ser. No. 07/727,398, now issued as U.S. Pat. No. 5,103,957.

BACKGROUND OF THE INVENTION

Field of the Invention

The invention relates to a parking meter for renting a parking space for a period of time. More generally, the invention relates to a time meter for dispensing time in return for money. The invention also relates to a data communication apparatus and method, particularly suited for programming and extracting data from an electronic parking meter.

In the art of money operated timing devices, coin operated parking meters are well known. Typically, a parking meter is mounted on a stand situated on a boulevard adjacent a curb on a street. The street is usually marked with painted lines to indicate a parking space which is controlled by the parking meter. A driver wishing to park a car in the space controlled by the meter simply parks in the space and then deposits coins in the meter to purchase a period of parking time.

A parking meter such as that described in U.S. Pat. No. 4,792,032 to Shapiro has a mechanism including a plurality of contacts which are used to sense the denomination of each coin inserted into the meter. The contacts provide electric signals to an electronic circuit which meters parking time and maintains a visual display of remaining parking time. The circuit is contemplated as being a retrofittable upgrade to existing meters. The circuit has the capability that the parking rate (i.e. time per unit of money) and the maximum permitted parking time can be programmed by switches to any of a plurality of values. The contacts of the Shapiro device could however, be susceptible to corrosion and fouling due to dirt which may accumulate thereon over time. Corroded or dirty contacts can lead to unreliable operation of the meter leading to loss of revenue to the owner of the meter. When the circuit is a retrofittable upgrade, an installer is required to solder connecting wires to a printed wiring board having copper contact pads and is required to solder contacts onto a coin path of the device. These steps do not render the process of installing the upgrade an easy task as considerable time is required to perform the steps. In addition, the switches used to set the parking rates and maximum time values of the meter must be set while the meter is open and therefore may only practically be set when the meter is in a repair shop or when the meter is open for removal of money. This means that setting the switches is time consuming and provides an opportunity for an error to occur in the setting. Thus, the meter cannot practically meter time at several different rates during different intervals of the day.

U.S Pat. No. 4,228,519 to Pfeifer discloses a system which employs a plurality of parking meters, each of which is connected to a central control unit. The central control unit and each of the parking meters contains its own microprocessor. The central control unit contains information relating to various tariffs (rates) and times during which the various rates are in effect and continuously transmits this information to the parking meters. The individual parking meters thus meter parking time at any of a plurality of predefined rates. The Pfeifer device, however, requires the use of the central control unit which would be difficult and expensive to install in a parking area such as found in a large airport or a major city as wiring costs and labor costs would be enormous.

U.S. Pat. No. 4,379,334 to Feagins Jr. et al. discloses an electronic parking meter which computes a length of time purchased from the amount of money inserted into the meter in accordance with any of a plurality of rates which may be in effect. The meter dispenses a parking ticket which the vehicle driver places in a window of the vehicle to indicate that parking time has been purchased. The meter keeps a lot status log containing supervisory information such as number of transactions, total receipts, etc. useful in determining appropriate intervals for cash box removal. This meter would be impractical for use on city streets due to the expense of having ticket dispensing equipment in each meter.

In view of the above patents, other patents in the field of parking meters, and market requirements, it would appear there is a need for a self contained parking meter which eliminates the mechanical timing mechanism of prior art devices and replaces that mechanism with an economical, yet versatile electronic timing circuit. In eliminating the mechanical timing mechanism, it is desirable to refrain from the use of electrical contacts in a coin sensing portion of the circuit to avoid the problems associated therewith. In such a device, it is desirable to include provisions for permitting a variety of operating parameters such as parking rates, etc. to be stored and changed easily without excessive effort. Furthermore, it is desirable to provide a device which permits automatic parking rate adjustment according to the time of day and which provides status information to enable meter usage to be evaluated. In addition there is a need for a retrofittable upgrade kit having the above features but which is easy to install in conventional mechanical parking meters.

SUMMARY OF THE INVENTION

In accordance with one aspect of the invention there is provided an apparatus and method for communication of data, the apparats including a transmitter operable to transmit a first signal at a first frequency and a second signal at a second frequency. The second signal is modulated to represent data and the transmitter ends transmission of the second signal when the transmission of data is completed. The apparatus further includes a receiver switchable between a first frequency receive mode and a second frequency receive mode, the first frequency receive mode rendering the receiver operable to receive signals at the first frequency and the second frequency receive mode rendering the receiver operable to receive signals at the second frequency. The first frequency receive mode is a low power mode and the second frequency receive mode is a data communication mode. The apparatus also includes a device for switching the receiver into the low power mode, for switching the receiver into the data communication mode when said first signal is received, and for switching the receiver into the low power mode when transmission of said second signal is ended.

BRIEF DESCRIPTION OF THE DRAWINGS

FIG. 3 is a simplified cross sectional view taken along the lines 3—3 of FIG. 2 illustrating a portion of a money receiving means;

FIG. 5 is a table illustrating registers in a random access memory (RAM) of a microprocessor of the electronic circuit of FIG. 4;

FIG. 7 is a simplified flow diagram of a timer category of routines of the circuit of FIG. 4;

FIG. 8 is a simplified flow diagram of a coin category of routines of the circuit of FIG. 4; and FIG. 9 is a simplified flow diagram of a communications category of routines of the circuit of FIG. 4.

DESCRIPTION OF THE PREFERRED EMBODIMENT

Mechanical Aspects—FIGS. 1-4

Figure 1:
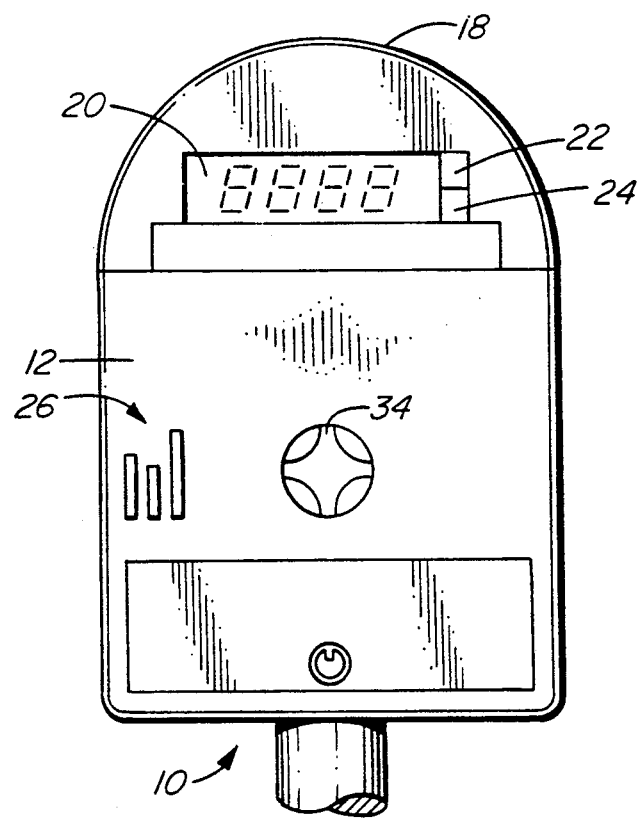
FIG. 1 is a simplified front view of a parking time meter according to the invention.

Referring to FIG. 1, a time meter for metering parking time is shown generally at 10. The meter has a waterproof housing 12 in which is contained a coin receiving mechanism shown generally at 14 in FIGS. 2 and 3 and an electronic circuit shown schematically at 16 in FIG. 4. Referring back to FIG. 1, the housing has a transparent portion 18 through which a display 20 and an infra-red transmitter 22 and receiver 24 of the electronic circuit may be seen. The housing also has a plurality of coin receiving slots 26 in which coins may be inserted to load the coins into the coin receiving mechanism 14 of FIGS. 2 and 3.

Figure 2:
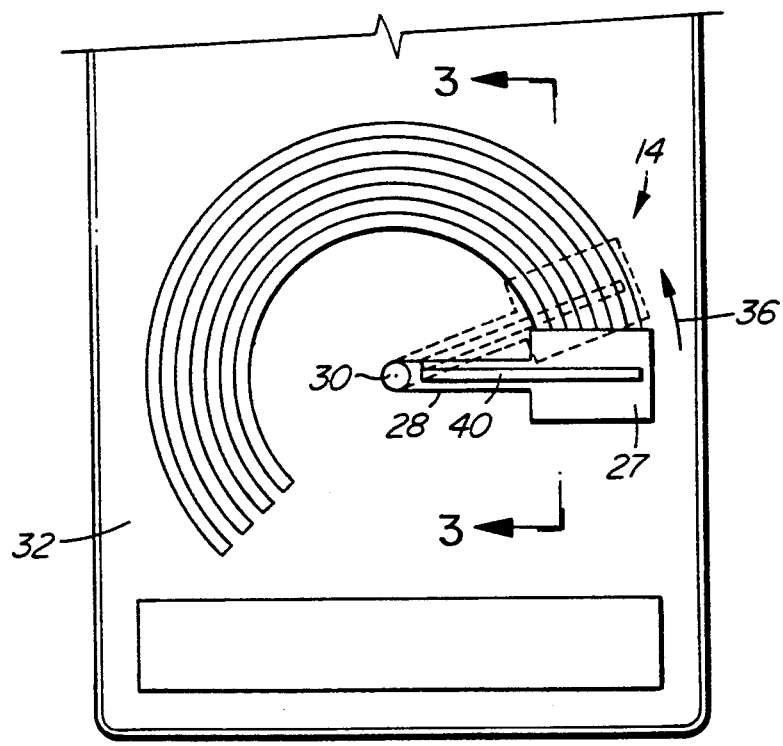
FIG. 2 is a simplified rear view of the meter of FIG. 1, a rear housing, electronic circuitry and a portion of a timing mechanism being removed to expose a coin carriage mechanism.

Referring to FIGS. 2 and 3, in this embodiment, the coin receiving mechanism 14 is similar to a mechanism found in a device known as a "Duncan Mechanical" meter, manufactured by Duncan Industries, a division of Qonaar Corporation of Elk Grove Village, Ill. In this embodiment, and in the prior art Duncan meter, the coin receiving mechanism 14 includes a coin carriage 27 rigidly connected to an arm 28. The arm is connected to a rotatable shaft 30 extending through a wall 32 of the housing 12. Referring to FIG. 1., a winding knob 34 is connected to the shaft 30 and may be used to rotate the shaft thereby moving the coin carriage 27 in the direction indicated by arrow 36 in FIG. 2.

Referring to FIGS. 2 and 3, the coin carriage 27 has three coin receptacles cut therein, a quarter coin receptacle only being shown at 38 in FIG. 3. Each receptacle is dimensioned to accommodate a pre-determined denomination of coin. The quarter coin receptacle is . 1 dimensioned to receive a quarter coin . The other two receptacles (not shown) are dimensioned to receive a dime and a nickel respectively. It will be readily apparent to one of ordinary skill in the art that the receptacles may be dimensioned to accommodate other currency such as Deutschemarks, Pesos, Yen, etc.

Referring to FIG. 2, the coin carriage 27 has a rig wheel engagement pawl 40 which extends the length of the arm 28. Referring to FIG. 3, the pawl has an inner portion 46 which extends into the coin receptacles and is guided therein by a guide slot 48. The quarter receptacle only is shown in FIG. 3, the dime and nickel receptacles being similar.

The pawl 40 is pivotally connected to arm 28 near the connection of the arm to the rotatable shaft 30. The inner portion 46 of the pawl is thus able to move into and out of the coin receptacles as the pawl pivots. A spring 50 biases the pawl 40 inwards causing the inner portion 46 to extend into the quarter receptacle 38. An outer portion 52 of the pawl extends through the guide slot 48, and outwardly of a rear portion of the coin carriage towards an inner portion of the meter.

Immediately above the coin receiving slots 26, a rear portion 54 of the wall 32 has ridges cast therein. This portion of the meter is commonly known as the coin segment. The ridges form grooves which define three pathways 56, 58, 60 for guiding coins received in the meter. The pathways each have a ramp surface extending progressively further inwardly toward the interior of the meter from the rear portion 54 along the length of the pathways.

Referring to FIG. 3, when a coin such as a quarter 62 is received in the quarter coin receptacle 38, the ramp surface of the pathway 60 causes the quarter to move further into the receptacle as the winding knob 34 of FIG. 1 is turned. As the coin moves further into the receptacle, it urges the inner portion 46 of the pawl to move inwards while the outer portion 52 moves outwards away from the coin carriage 27, towards the inner portion of the meter.

Immediately behind the coin carriage 27 is a rotatable rig wheel 64 having a plurality of teeth 66 spaced apart by interdental spaces 68. The rig wheel is disposed closely adjacent the coin carriage 27 to enable the pawl outer portion 52 to enter any of the interdental spaces 68 in the rig wheel. When the outer portion of the pawl moves into an interdental space, continued rotation of the winding knob 34 of FIG. 1 causes the outer portion to bear upon an adjacent tooth, thereby rotating the rig wheel in the same direction. The outer portion 52 is shown bearing upon a tooth in broken outline at 52.1 in FIG. 3.

When the winding knob has been fully rotated, the coin has been carried along the full distance of the path and the coin drops out of the coin carriage into a money chamber 70. A spring 72 is connected to the rig wheel 64 and returns the rig wheel to the unrotated or "home" position. Another spring (not shown) also returns the winding knob to the home position.

The coin receptacles in the coin carriage 27 are cut to different depths, depending upon the diameter of the coin they are intended to hold and upon the denomination of the coin. The depth of the coin receptacle for any given coin determines how far the coin carriage 27 can travel over the pathways 56, 58, 60 before the ramp in the pathway urges the coin against the winding pawl 40. The depth of each coin receptacle in the coin carriage is cut to cause the coin with the highest money value to urge the portion of the corresponding winding pawl to engage the rig wheel 64 almost immediately upon rotation of the winding knob 34 of FIG. 1. Consequently, when a quarter is inserted into the meter, the rig wheel will be rotated almost immediately upon rotation of the winding knob, the rotation being through essentially the full angle of rotation of the winding knob. The depth of the coin receiving slot for the coin with the next lowest money value is cut to cause the corresponding winding pawl to engage the rig wheel after partial rotation of the winding knob. The depth of the coin receiving slot for the coin with the lowest money value is cut to cause the corresponding winding pawl to engage the rig wheel after considerable rotation of the winding knob. Typical angles of rotation of the rig wheel are 160 degrees for a quarter, 70 degrees for a dime and 10 degrees for a nickel. The coin receiving mechanism 14 thus acts as money receiving means for receiving a denomination of money and the rig wheel acts as a movable output member which rotates by an amount determined by the denomination of money received.

Most of the apparatus described thus far relating to coin verification may be found in the "Duncan Mechanical" meter described above. The apparatus described in the following relates to a retrofit kit which replaces a mechanical clock timing mechanism (not shown) of the Duncan meter which is normally actuated by the coin verifier described above.

Referring to FIG. 3, the rig wheel 64 is connected to an input shaft 74 of a rotary potentiometer 76 so that rotation of the rig wheel causes a corresponding rotation of the potentiometer input shaft 74. Thus, when a quarter is inserted into the meter and the winding knob 34 of FIG. 1 is rotated, approximately 160 degrees of rotation of the potentiometer shaft 74 will occur, or if a dime is inserted, approximately 70 degrees of rotation will occur or if a nickel is inserted, approximately 10 degrees of rotation will occur.

Figure 4:
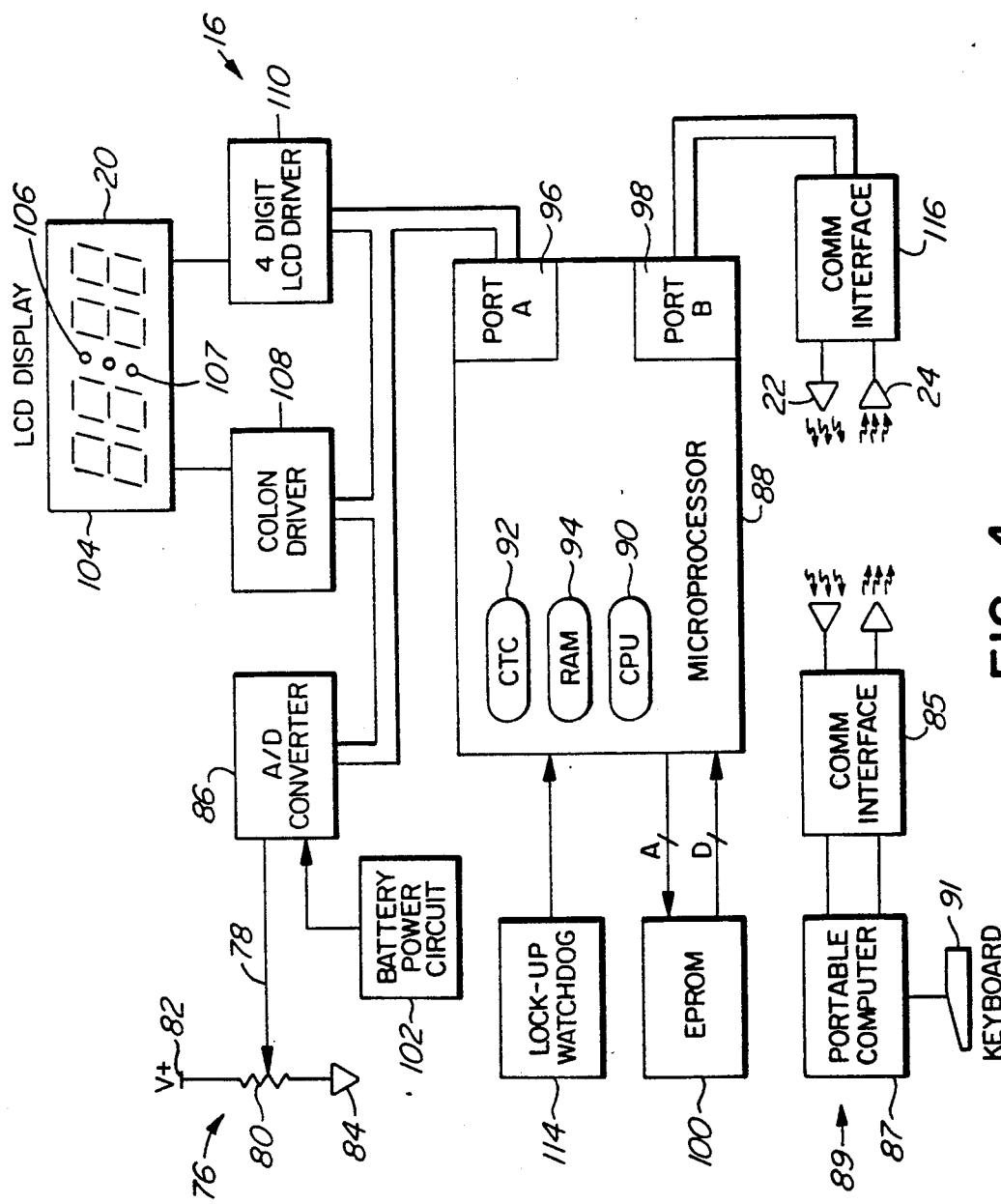
FIG. 4 is a block diagram of an electronic circuit according to the invention.

Referring to FIG. 4, the potentiometer is shown in schematic form at 76 as part of the electronic circuit 16. The potentiometer 76 has a wiper arm 78 which sweeps across a resistive portion 80 as the shaft 74 of the potentiometer is rotated, the resistive portion being connected between power and ground conductors 82 and 84 respectively of the circuit.

A wiper potential appears between the wiper 78 and the ground conductor 84, the potential depending upon the amount of rotation of the potentiometer shaft 74. When the rig wheel 64 of FIG. 3 is in the home position, the potentiometer shaft is also in a home position wherein the wiper potential is almost equal to zero volts. When the rig wheel and hence the potentiometer shaft are fully rotated, the wiper potential is almost equal to the power conductor voltage. The wiper potential varies in proportion to the amount of rotation of the potentiometer shaft. As the amount of rotation of the shaft 74 is determined by the denomination of the coin inserted, the wiper potential is thus dependent upon the denomination of a coin inserted into the meter. The potentiometer and the power and ground conductors 82 and 84 of FIG. 4 act as money signal generating means for generating a money signal responsive to movement of the output member, the output member corresponding to the rig wheel 64 of FIG. 3. The money signal has a voltage which varies in proportion to the amount of rotation of the rig wheel 64.

Referring to FIG. 4, the money signal is transmitted by a conductor to an analog to digital converter (A/D) 86. In this embodiment, the analog to digital converter comprises four voltage comparator circuits (not shown). Each comparator circuit is designed to detect whether or not the money signal voltage is above or below a respective reference value. The respective reference values for each comparator circuit are chosen to correspond to the minimum money signal voltage which is produced for a quarter, a dime, a nickel and for only slight movement of the rig wheel respectively. Thus, as a quarter rotates the rig wheel and potentiometer shaft by approximately 160 degrees, the money signal voltage obtained for a shaft rotation of slightly less than 160 degrees is chosen to be the reference voltage for the quarter comparator circuit. A separate voltage divider circuit (not shown) supplies a reference voltage of this value to the comparator circuit. Two of the remaining comparators have reference voltages chosen to correspond to the money signal voltage obtained for shaft rotations of slightly less than 70 degrees and 10 degrees respectively, to represent dimes and nickels respectively. The fourth comparator is a home comparator and has a reference voltage chosen to correspond to the money signal voltage obtained for only slight shaft rotation from the home position. Each of these comparator circuits also has a separate voltage reference circuit. The outputs of the comparator circuits are rendered active depending upon the money signal voltage and therefore three outputs are rendered active ultimately upon the denomination of coin inserted into the meter while one output is rendered active for only slight rotation of the rig wheel. The comparator designed to detect a money signal voltage corresponding to 160 degrees of rotation of the shaft 74 of FIG. 3 provides a quarter signal. The comparator circuits designed to detect money signal voltages corresponding to 70 degrees and 10 degrees of shaft rotation provide dime and nickel signals respectively, and the comparator circuit designed to detect a money signal voltage corresponding to only slight shaft rotation provides a home signal.

When a quarter is inserted into the meter and the winding knob 34 of FIG. 1 is rotated, the rig wheel 64 of FIG. 3 begins to rotate. As the rig wheel rotates out of the home position, the home signal is rendered active. As the rig wheel passes through approximately 10 degrees of rotation, the nickel signal is rendered active. As the winding knob is further rotated, the rig wheel passes through 70 degrees of rotation whereupon the dime signal is rendered active and as the winding knob is further rotated, the rig wheel passes through 160 degrees of rotation whereupon the quarter signal is rendered active.

The quarter, dime and nickel signals are ordered such that the quarter signal represents a most significant bit (MSB) and the home signal represents a least significant bit (LSB) of a code representing the rotation of the rig wheel 64 and hence representing the presence of a quarter, dime, or nickel inserted into the meter or, rotation of the rig wheel from the home position. Using negative logic, a quarter is represented by the code (0000), a dime by (1000), a nickel by (1100) and no coins or the condition that the rig wheel is in the home position is represented by (1111).

Electronic Circuit—FIG. 4

Referring to FIG. 4 the quarter, dime and nickel signals are connected to a microprocessor shown generally at 88. In the preferred embodiment the microprocessor is a MOTOROLA 6805. The microprocessor includes a central processing unit (CPU) 90, a counter/timer circuit (CTC) 92, a random access memory (RAM) 94 and input/output ports (I/O ports) A and B which are also designated 96 and 98. An erasable programmable read only memory (EPROM) 100 is connected externally to the microprocessor by address and data lines as is commonly known in the art.

Port A of the microprocessor is a bidirectional port and therefore permits operation in an input mode or an output mode. In the input mode, the quarter, dime and nickel signals are supplied to port A of the microprocessor whereupon the signals may be read by the CPU 90. Also supplied to Port A is a low battery signal from a battery power circuit 102 having a low battery detect circuit (not shown) incorporated therein and a battery such as a lithium cell (not shown) for supplying power to the entire electronic circuit. The low battery detect circuit compares the battery voltage with a pre-determined reference voltage and if the battery voltage is lower than the reference voltage, the low battery signal is rendered active. The low battery signal is capable of being read by the CPU 90 at port A.

When Port A is in the output mode, the display described earlier in connection with FIG. 1 may be controlled by the CPU. The display described earlier is shown generally at 20 in FIG. 4 and includes a liquid crystal display (LCD) having four digits 104, a colon 106, and a low battery indicator 107. A pair of digits on the left hand side of the display is used to represent hours while a pair of digits on the right hand side is used to represent minutes. The colon and low battery indicator are positioned between the left hand and right hand pairs of digits. The colon is flashed on and off alternately each second, while the low battery indicator is activated as required. A colon driver circuit 108 interfaces the colon and the low battery indicator on the display to Port A of the microprocessor 88 and a four digit LCD driver circuit 110 interfaces the digits of the display to Port A. The CPU 90 can place Port A in the output mode and can write to certain bit locations of Port A corresponding to the colon driver and the digit driver to control the colon 106, the low battery indicator 107 and digits 104 respectively.

The counter/timer circuit 92 is configured to provide a counter interrupt signal in the form of a software interrupt to the microprocessor 88 at periodic intervals. In the preferred embodiment, the counter/timer is configured to implement a frequency divider (not shown) arranged to provide a voltage pulse once every 40 mS, thus producing pulses at a rate of 25 per second. The microprocessor is interrupted by the counter interrupt signal at the rate of 25 times per second. The counter interrupt signal acts as a periodic time reference signal.

The electronic circuit 16 further includes a lock up watch dog circuit 114 which monitors the operation of the microprocessor 88. The lock up watch dog circuit includes a hardware timer (not shown) which is designed to interrupt and reset the microprocessor every six seconds, unless the hardware timer itself is reset first. The microprocessor is programmed to reset the hardware timer once every 40 mS and therefore as long as the microprocessor is functioning properly and resetting the timer, the watchdog circuit cannot reset the microprocessor. If the microprocessor fails to reset the timer, the watchdog circuit causes the microprocessor to reset and restart. A condition of the microprocessor failing to reset the timer could occur if an electrostatic discharge (ESD) hits the meter. The microprocessor could become unpredictable at which point it would not reset the timer and the timer would reset and restart the microprocessor. The watchdog circuit thus restores the microprocessor to normal operation in the event of an electrical upset.

The circuit 16 further includes a communications interface 116. The communications interface is connected to Port B of the microprocessor 88 and permits two way half duplex asynchronous communication between the microprocessor and an external device 89. In the preferred embodiment, communication is carried out by transmission and reception of infra-red energy by the infra-red transmitter and infra-red receiver described earlier and shown in FIG. 4 at 22 and 24 respectively. The communications interface 116 thus acts as an interface permitting wireless communication with the external device.

Figure 10:
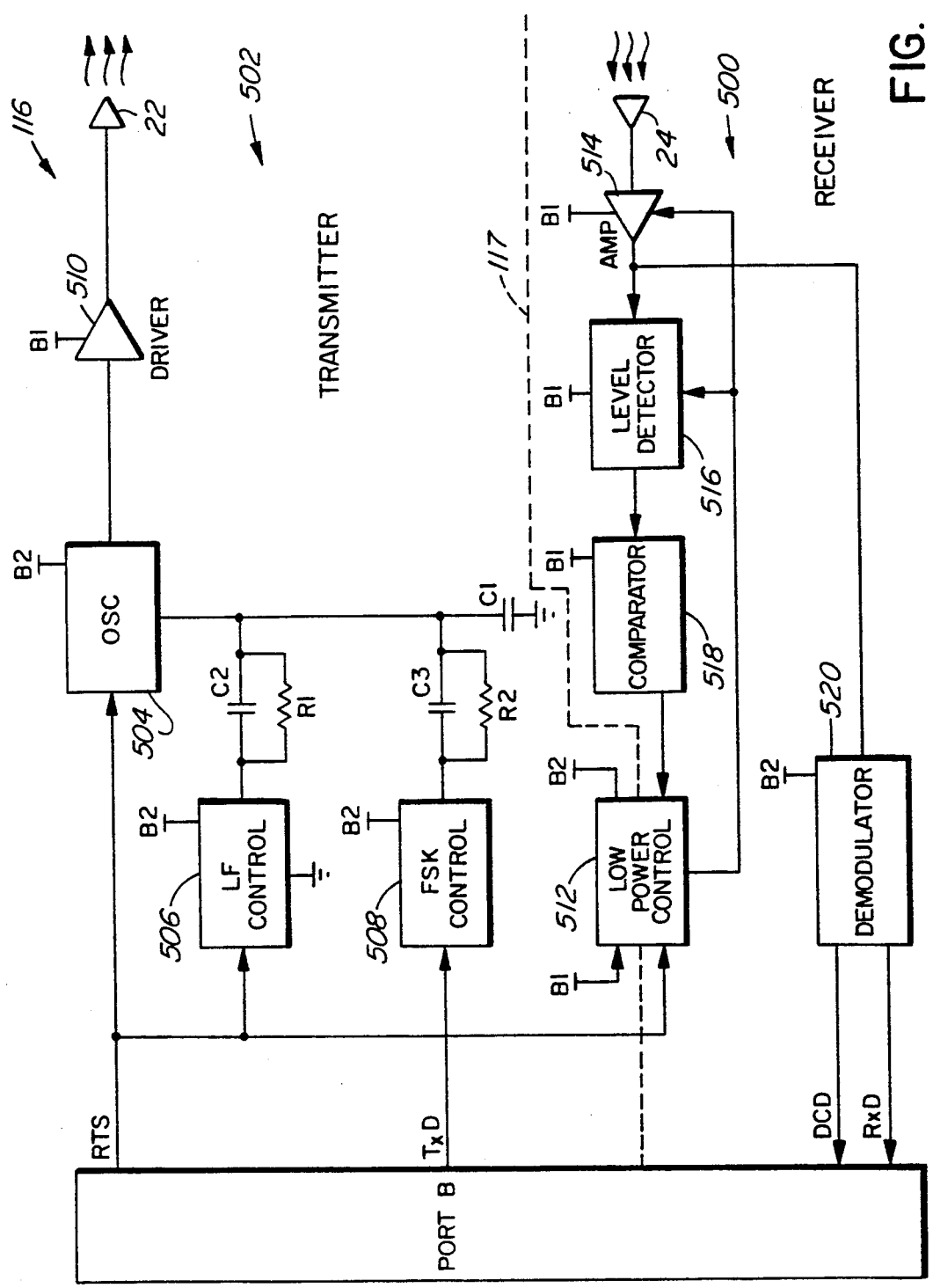
FIG. 10 is a simplified block diagram of a communications interface of the electronic circuit of FIG. 4.

Communications Interface—FIGS. 4 and 10

Referring to FIG. 10 the communications interface is shown generally at 116. The interface includes a receiver portion 500 and a transmitter portion 502, the portions being separated by broken line 117. Both portions are connected to port B of the microprocessor 88 of FIG. 4. The receiver portion is connected by signal lines designated DCD and RxD. The states of these signal lines determine the setting of corresponding bits at port B. The transmitter portion is connected by signal lines designated RTS and TxD. Bits set by the CPU at port B change the states of these signal lines.

The transmitter portion 502 includes an oscillator 504, a low frequency control circuit 506, a Frequency Shift Keying control circuit 508, a signal driver circuit 510, and the infra-red emitter 22 described previously. A first capacitor C1 is connected to the or to permit the oscillator to produce a relatively high frequency signal of approximately 40 kHz as will be explained further herein.

The RTS signal from Port B is received by the oscillator 504 and renders the oscillator active. The RTS signal is also received by the low frequency control circuit 506 which places a second capacitor C2 in parallel with the first capacitor C1 in response to the RTS signal. The low frequency control circuit 506 has a time delay circuit (not shown) which permits the second capacitor to remain in parallel with the first capacitor only for a pre-determined time, which in the preferred embodiment is approximately 50 mS. While the first and second capacitors are in parallel, the oscillator produces a first signal at a first frequency, the first frequency being approximately 500 Hz. The first signal is amplified by the driver 510 and is emitted as infra-red energy by the infra-red emitter 22. When the 50 mSec time delay of the time delay circuit has expired, the second capacitor is switched out of the circuit at which time the oscillator frequency switches to approximately 40 kHz.

The TxD signal from Port B is received by the Frequency Shift Keying (FSK) control circuit 508 which places a third capacitor C3 in parallel with the first capacitor C1 in response to the TxD signal. With the first and third capacitors in parallel the oscillator 504 produces a second signal at a second frequency, the second frequency being approximately 30 kHz. Thus by switching the state of the TxD signal at Port B, capacitor C3 is switched in and out of the circuit, thereby changing the oscillation frequency of the oscillator between 30 kHz and 40 kHz. Thus the second signal is frequency shift keyed between 30 kHz and 40 kHz in response to the TxD signal, the 30 kHz and 40 kHz frequencies corresponding to marking and spacing conditions of the second signal.

Both C2 and C3 have respective resistors R1 and R2 in parallel therewith in order to preserve phase coherence when switching between frequencies such as when switching the oscillator frequency from the first frequency to the second frequency or when switching the oscillator between 30 kHz and 40 kHz for FSK. Each resistor is chosen to have a value sufficiently high to maintain the desired frequencies and sufficiently low to bleed charge from respective capacitors. In the preferred embodiment C1=270pf, C2=2.2nf, C3=100pf, R1=1M, and R2=1M.

Both the transmitter and the receiver share a low power control circuit 512 In connection with the transmitter 502, the oscillator 504, low frequency control circuit 506 and FSK control circuit 508 are connected to the low power control circuit. The low power control circuit maintains the oscillator, low frequency control circuit, and the FSK control circuit in a low power mode by supplying power thereto using power conductor B1, only in response to an active RTS signal. When the RTS signal is inactive, the low power control circuit prevents power from being supplied to the oscillator, the low frequency control circuit and the FSK control circuit. When the RTS signal is active, however, the low power control circuit supplies power to these circuits. The low power control circuit thus maintains the transmitter in a low power mode when transmission is not occurring and thereby conserves power in the circuit as is desirable due to the limited capacity of the lithium cell powering the circuit.

The receiver portion 500 includes a photo diode which acts as the infra-red receiver 24 described previously, for producing a signal in response to infra-red energy impinging thereon. The signal is supplied to an amplifier circuit 514 which has a gain-bandwidth product responsive to current supplied to the amplifier. The gain of the amplifier is high and the bandwidth is low when low current is supplied and the gain is high and the bandwidth is high when high current is supplied The current to the amplifier circuit is supplied by the low power control circuit 512 which normally supplies low current, thereby maintaining the amplifier in the high gain, low bandwidth condition. As low current is supplied, in this condition the amplifier is in a low power mode. In the low power mode, the amplifier provides high gain to signals such as the first signal which have frequencies near the first frequency of 500 Hz as described above. The amplifier is thus maintained in a first frequency receive mode, the first frequency receive mode being a low power mode.

The amplifier 514 is connected to a level detector circuit 516 which integrates signals supplied by the amplifier and produces a detect signal in response thereto. The level detector produces the detect signal when the first signal is received The detect signal is supplied to a comparator 518 which compares the detect signal with a reference signal and provides an active comparator signal when the detect signal is above the reference signal. The comparator signal is supplied to the low power control circuit 512 which increases or decreases the current to the amplifier circuit 514 in response to the comparator signal. When the comparator signal is inactive, the current supplied to the amplifier is maintained at a low level, thereby maintaining the receiver in the low power, first frequency receive mode. When the comparator signal is active, the low power control circuit 512 increases the current to the amplifier thereby increasing the gain-bandwidth product of the amplifier and placing it in a second frequency receive mode whereby the second frequency may be received. The low power control circuit also supplies power to a demodulator circuit 520 to be further explained below. It can be seen that the low power control circuit 512 thus provides means for maintaining the receiver in the low power, first frequency receive mode and the level detector 516, comparator 518 and low power control circuit 512 provide means for switching the receiver from the first frequency receive mode to the second frequency receive mode when the first signal is received.

Continued transmission of the first signal or transmission of the second signal after the amplifier 514 has been switched into the second frequency receive mode will result in the level detector 516 producing a detect signal above the reference signal and therefore the low power control circuit 512 will maintain the high current supply to the amplifier to maintain it in the second frequency receive mode. While the circuit is in the second frequency receive mode, the signal produced by the amplifier is supplied to the demodulator circuit 520. The demodulator circuit interprets the second signal as amplified by the amplifier 514 and renders the DCD signal active to signal the presence of the second signal to Port B of the microprocessor. The demodulator circuit 520 then renders the RxD signal active and inactive in response to the marking and spacing conditions in the second signal. The state of the RxD signal thus reflects data received by the receiver.

Provided the second signal is appearing at the sensor 24, the level detector 516, comparator 518 and low power control circuit 512 maintain the amplifier 514 in the second frequency receive mode. When the second signal is no longer received, the level detector signal drops below the reference signal whereupon the comparator 518 causes the low power control circuit 512 to reduce the current supplied to the amplifier 514 and prevent current flow to the demodulator 520 whereupon the receiver is placed back into the low power, first frequency receive mode.

Referring back to FIG. 4, in the preferred embodiment, the external device 89 to which the communications interface transmits and receives includes a portable computer 87 connected to a communications interface 85 similar to the communications interface 116 included in the parking meter. In the preferred embodiment, the portable computer is a device manufactured by Psion (a British Corporation) as Model No. "XP". The portable computer has a keyboard 91 which is used to enter commands for transmitting and receiving data. The commands are stored in a memory of the portable computer and a transmit sequence of keystrokes entered at the keyboard is used to initiate transmission of commands and data to the communications interface 116 in the parking meter. Data may also be received by the device, such as occurs when the interface 116 in the parking meter transmits data, the data received by being stored in the memory of the portable computer

Registers—FIG. 5

The RAM in the microprocessor is partitioned into a plurality of parameter registers for storing operating parameters and data relating to the meter. The microprocessor thus acts as a computer programmed to maintain a plurality of registers for storing operating parameters and data relating to the meter.

Referring to FIG. 5, the parameter registers include a group of real time clock registers 122 which are used to hold values representing the current year, month, day, day of week, hour, minute and second. Default values set the real time clock register to Jan. 1, 1989, 00:00:00 am.

The parameter registers further include a rate group of registers 124 for storing a plurality of rates and effective times during which each of the rates is in effect. In the embodiment shown, three rates are possible. It will be readily apparent that by merely expanding the number of registers in the group of rate registers any number of different rates are possible.

In the embodiment shown, a first rate corresponds to the price per minute of parking time during the hours between 9 a.m. and 5 p.m. on a weekday. A second rate corresponds to the price per minute for parking time between the hours of 5 p.m. and 9 a.m. on a weekday. A third rate corresponds to the price per minute of parking time during a weekend. The rate group of registers includes effective time registers which store values indicating beginning and ending times of intervals during which corresponding rates are in effect. It will be readily apparent that by further expanding the number of registers in the rate group of registers, beginning and ending times of intervals corresponding to additional rates may be accommodated.

The rate registers further include a lowest denomination value pointer register (LDV pointer) which contains a value representing the location in a look-up table, of a number representing a lowest common denominator which divides evenly into the money values of each coin which can be inserted into the meter. In the preferred embodiment, the meter is capable of receiving quarters, dimes and nickels. The quarter has money value of $0.25, the dime $0.10 and the nickel $0.05. As $0.05 is the lowest common denominator, this number is stored in the look-up table.

The rate registers further include a maximum time duration register which contains a number representing the maximum time interval for which parking time may be purchased. In the preferred embodiment, this register has a value of 120 minutes. It will however, be readily apparent to one of ordinary skill in the art that this value may alternatively be set to any value such as 15 minutes, 20 minutes, 30 minutes, 40 minutes, 45 minutes, 60 minutes, 120 minutes, etc.

The parameter registers further include a group of Port A and Port B data registers 126 and 128 which are used to transfer data to and from each port. Both Port A and Port B are bidirectional and are operational in an input mode and an output mode. In the output mode, bits of the Port A data register, are set by the CPU 90 of FIG. 4 to control signal lines connected to the colon driver 108 and the 4-digit LCD driver 110. In the input mode, bits of the Port A data register reflect the states of the quarter, dime, nickel and home signals from the analog to digital converter 86 and the battery power circuit 102. The Port B data register 128 is provided for receiving or transmitting data asynchronously via the communications interface.

The parameter registers further include a group of parking time clock registers 130 which include hour, minute, second and 1/25th second registers. These registers each contain an initialization value of zero. The parking time clock registers act as time registers for storing a time clock value representing total time remaining in a parking time interval The parameter registers further include a group of non-resettable grand total registers 132. These registers also contain an initialization value of zero. The group of non-resettable grand total registers acts as a group of grand total registers for storing a total money value representing total money received in the time meter.

The parameter registers further include a group of hourly report registers 134 which include day registers, hour interval registers, and day and hour pointer registers and a start hour register. In the preferred embodiment there are eight day registers each having four three-hour interval registers associated therewith. The four registers are designated 0-2, 3-5, 6-8, and 9-12 and correspond to the four three-hour intervals between 8:00 a.m. and 11:00 a.m., 11:00 a.m. and 2:00 p.m. and 5:00 p.m. and 8:00 p.m.. The pointer registers contain values indicating the current day and hour interval in effect.

The parameter registers further include a group of non active accumulator registers 136. These registers include eight day registers for keeping a record of money inserted into the meter during periods of inactivity each day, and one hour register for keeping a record of the number of consecutive hours during which no money is inserted into the meter.

The parameter registers further include a group of Z report status registers 138 including month, day and counter registers. The month and day registers have an initialization value setting the month and day to Jan. 1. The counter register has an initialization value of zero.

The parameter registers further include a money register 140. This register has an initialization value of zero.

The parameter registers further include a group of coin accumulation registers 142 which include nickel, dime and quarter registers. Each of these registers has an initialization value of zero.

The parameter registers further include a group of negative time registers 144. These registers include minute registers which store values indicating the length of a grace period or overpark period which becomes effective after paid parking time has expired (ie. elapsed past zero). These registers have an initialization value corresponding to five minutes of grace period.

The EPROM 100 contains program code including a look-up table segment and a program segment. The look-up table segment includes look-up tables containing various default operating parameters such as coin value multipliers for determining the money value of each coin. Such a table correlates codes received at Port A with corresponding money values of coins. The program segment includes subroutines necessary for the operation of the meter. The program code further includes code segments representing a revision number of the program contained in the EPROM.

Operation

Referring to FIG. 4, upon applying power to the electronic circuit 16, the CPU 90 addresses predefined locations in the EPROM 100 corresponding to the program code. The program code includes an initialization subroutine which is optionally run by selection of hardware jumpers (not shown) and which copies default values included in the program code into appropriate registers in the RAM 94. After loading the initialization values, processing is then directed to a real time clock subroutine.

The above initialization routine is run only if the appropriate hardware jumpers select the routine. The jumpers are normally only selected to run the initialization routine upon initial startup of the meter. Once tee meter is operational, the jumpers are removed and the initialization routine is prevented from running in the event of a watchdog reset or a manual reset. This ensures previously stored values in the RAM registers are not altered or lost unless power is removed from the circuit.

The real time clock subroutine proceeds to start the counter/timer circuit 92 of FIG. 4 whereupon the program code performs instructions necessary to implement a "software" real time clock by loading and incrementing the real time clock registers 122 with appropriate values. The microprocessor 88 then begins normal operation as described below.

Figure 6:
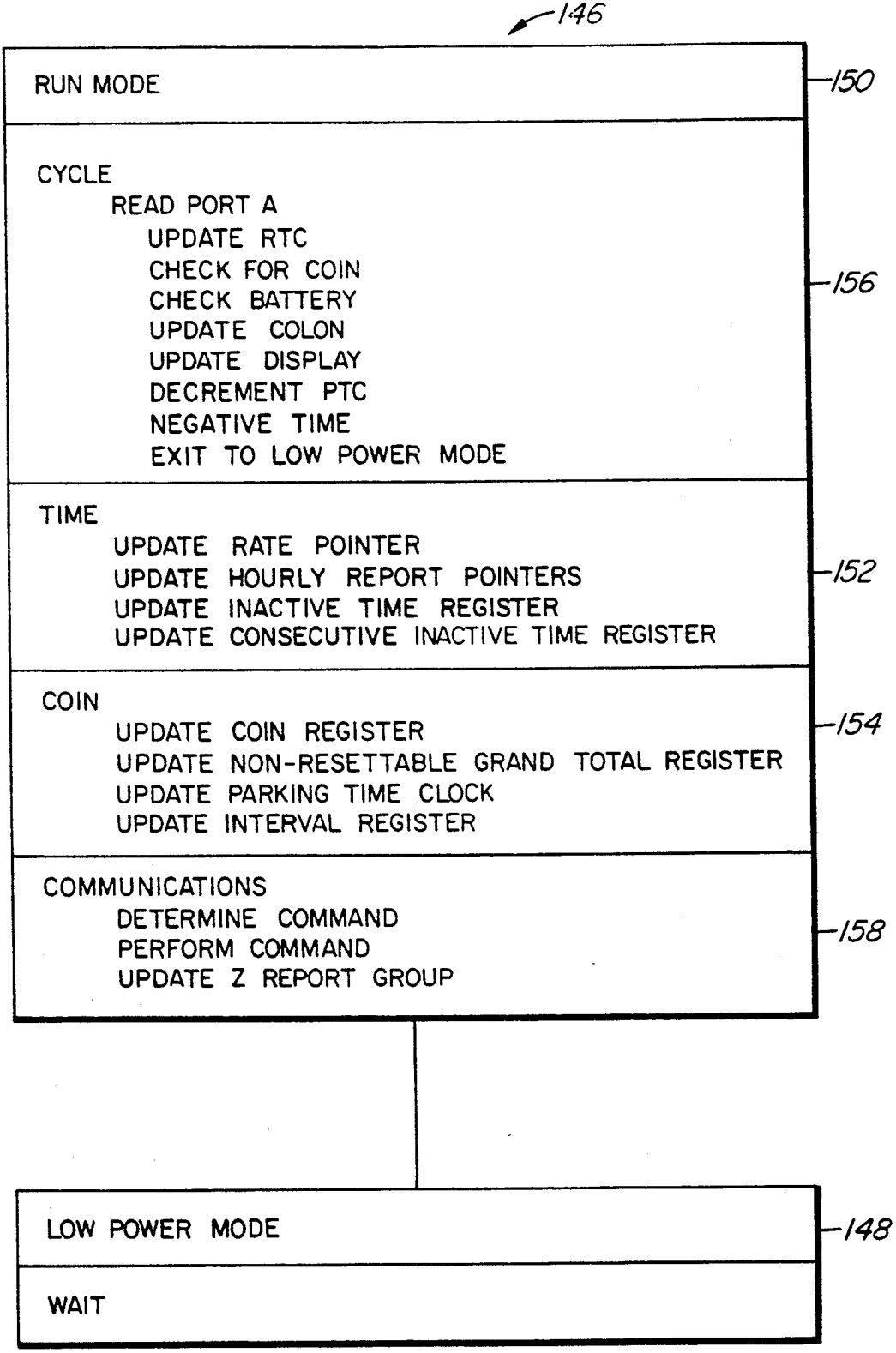
FIG. 6 is a simplified flow diagram of a main operating routine of the circuit of FIG. 4.

Normal operation of the microprocessor is conducted in a cycle shown generally at 146 in FIG. 6. In this cycle, the microprocessor is in a low power mode 148 for approximately 95% of the cycle and is in a run mode 150 for approximately 5% of the cycle. The microprocessor thus operates in an alternating manner between a low power mode and a run mode. As the microprocessor is in the low power mode most of the time, battery power consumption is minimized. In the preferred embodiment, the total time to complete a cycle is 40 milliseconds. This 40 millisecond value is derived from the 40 millisecond periodic counter interrupt signal generated by the counter/timer circuit 92. Each time the counter interrupt signal is provided, the microprocessor is switched into the run mode 150 and performs various functions depending upon operating parameters and data appearing at ports A and B. After completing the functions of the run mode 150, the microprocessor automatically sets itself into the low power mode 148 where it enters a wait routine until the next counter interrupt signal occurs. In the low power mode 148, all microprocessor functions, except the counter/timer circuit, are shut off and therefore the microprocessor draws minimal power from the battery power circuit 102 of FIG. 3. The RAM of the microprocessor is of CMOS technology and therefore only draws minimal power from the battery power circuit to maintain integrity of data contained therein.

Referring back to FIG. 6, the run mode 150 may be broken into four categories of operation. A time category 152 contains subroutines which are run every fifteen minutes. A coin category 154 contains subroutines which are run each time a coin is inserted into the meter and the winding knob is turned. A cycle category 156 includes subroutines which are run upon the initiation of each cycle of the run mode and a communications category 158 includes subroutines which are run when an external device is communicating with the parking meter.

Referring to FIGS. 5 and 7, the time category 152 includes a routine for updating the rate pointer register of the rate group of registers 124 in accordance with the time indicated by the real time clock registers 122. The routine compares the current time of day stored in the real time clock registers to each of the times stored in the effective time registers corresponding to each individual rate. Upon finding which time period corresponds to the current time of day, the appropriate rate category is determined. Once the rate category is determined, the pointer register is re-loaded with a value indicating the appropriate rate.

The time category 152 also includes a routine for updating the pointer registers of the hourly report group 134 in accordance with the time indicated by the real time clock registers 122. The routine loads the day pointer register with a value corresponding to the current day of the week. The routine also loads the hour pointer register with a value indicating the current three-hour interval of the day.

The time category 152 further includes an inactivity routine which keeps track of the total money inserted into the meter during specified intervals of time. In the preferred embodiment, the meter is deemed to be active during the hours between 8:00 a.m and 8:00 p.m. and is deemed to be inactive during the hours between 8:00 p.m. and 8:00 a.m. the following day. The inactivity routine monitors the money inserted into the meter during the inactive period and after each coin is inserted the routine adds an incremental value representing the money value of the coin to the appropriate day register of the non-active time accumulator registers 136. The appropriate day register thus keeps a running total of the total amount of money inserted into the meter during the inactive hours. The inactivity routine thus acts as meter inactivity means for keeping a record of meter inactivity during settable intervals of time.

The time category 152 further includes a monitoring routine which keeps track of the number of consecutive non-active hours of the meter. This is done by incrementing the hour register of the non-active time accumulator registers 136 by an incremental value corresponding to one hour for each consecutive hour during which the rig wheel has not been rotated. In the preferred embodiment, should the number of consecutive non-active hours during the hours between 8:00 a.m. and 8:00 p.m. be equal to or greater than 15 hours, the routine places the entire electronic circuit in a standby mode. This involves shutting off the LCD display. The condition that the meter is in the standby mode is indicated by causing the display to go blank while keeping the colon and low battery indicator active. The monitoring routine does however, have a provision whereby if money is inserted into the machine after the circuit has been placed in the standby mode, the display is reactivated and resumes normal operation. The monitoring routine thus acts as control means for placing the meter in a standby mode after a settable period of inactivity.

Referring back to FIG. 6, the cycle category of subroutines 156 includes a first subroutine which updates the real time clock registers and reads port A. If no coin has been inserted into the parking meter, a 1111 code will be read in bit positions of Port A corresponding to the states of the quarter, dime, nickel and home signals. The 1111 code indicates that no coin has been inserted into the meter.

Should a coin be inserted into the parking meter and the winding knob rotated, the code on signal lines representing the denomination of coin in the meter will switch to 1110 due to the home signal becoming active. When the CPU reads the code and finds it to be other than (1111), the code is compared to the contents of the money register 140 of FIG. 5. If the current code value is greater than the contents of the money register, the contents of the money register are replaced with the current code and processing continues with the next routine in the cycle category. If the current code value is less than the contents of the money register, the money register is deemed to contain the code of the coin inserted into the meter. After the coin has fallen out of the coin carriage into the money chamber, after the rig wheel has returned to the home position and after the home signal indicates the rig wheel is in the home position, a time delay routine is invoked which ignores any further rotation of the rig wheel for a period of one second. This serves to eliminate the effects of "bouncing" as may occur as the rig wheel settles into the home position. Immediately after the time delay routine is invoked, the coin category of routines 154 is invoked.

Referring to FIGS. 5 and 8, the coin category of routines updates the coin accumulation group of registers 142, updates the non-resettable grand total group of registers 132, updates the parking time clock registers 130, and updates an interval register in the hourly report group of registers 134. The coin category of routines also updates the non-active time accumulator registers due to the condition that the consecutive period of inactivity has been interrupted by the insertion of the coin.

When the coin category of routines is invoked, the coin code in the money register is used to determine which of the coin accumulation registers 142 is to be incremented. For example if a quarter is received in the meter, the quarter register is incremented by one, or if a nickel is received, the nickel register is incremented by one. The coin accumulation registers thus contain values representing the total number of each type of coin inserted into the meter. The above steps act as denomination recording means for recording the total number of each denomination of money inserted into the meter.

After the appropriate coin accumulation register 142 is updated, a subroutine compares the code in the money register 140 to codes stored in a look-up table (not shown) in the look-up table segment of the program code. The look-up table provides a coin value multiplier corresponding to the money value of the coin. In the preferred embodiment, the coin value multiplier for a nickel is one, for a dime two, and for a quarter five. The coin value multiplier for the coin code in the money register is multiplied by the contents of a register addressed by the lowest denomination value register of the rate group 124 to obtain a coin dollar value which represents an incremental value proportional to the denomination of money received. The coin dollar value is added to the contents of the non-resettable grand total register 132. This register therefore reflects the total dollar value of coins inserted into the meter. The subroutine performing the above steps thus acts as currency adding means for adding an incremental value to the total money value.

Another routine within the coin category 154 multiplies the coin dollar value obtained for the inserted coin by the appropriate time per dollar rate as provided by the rate group of registers 124. This routine reads the rate pointer register to determine the location of the appropriate rate value for the instant time of day. The rate value is multiplied by the coin dollar value and a time value is produced. This time value represents an incremental value proportional to the denomination of money received. This incremental value is added to the current contents of the parking time clock registers 130. The contents of the parking time clock registers thus reflect the total parking time purchased and represent the duration of a time interval during which time is metered. The contents of the parking time clock registers are compared to the contents of the maximum time register as a check whether the total parking time purchased is equal to or greater than the maximum time permitted as indicated by the maximum time register. Should the total parking time purchased be greater than the maximum time allowed, the contents of the parking time clock registers are cleared and loaded with the contents of the maximum time register. The parking time clock registers are thus updated with the lesser of the total parking time purchased or the maximum time permitted. The time meter thus includes time interval setting means for setting the time interval duration for a given money denomination according to any of a plurality of settable rates applicable during predefinable time intervals.

After the parking time clock is updated, the appropriate hourly report register of the hourly report group 134 is updated. Each time a coin dollar value for a given inserted coin is calculated, an activity routine reads the hourly report pointer register to determine the appropriate location in which to add the just calculated coin dollar value. For instance, if the pointer points to the register location for the six to eight hour interval of day one, the coin dollar value will be added to the contents of the six to eight hour register. In this way, the hourly report registers contain values indicating the total money received during the period indicated. The activity routine thus acts as meter activity recording means for keeping a record of meter activity during predefinable intervals of time.

After updating the hourly report register, processing in the coin category of routines is completed. Referring to FIG. 6, program flow continues in the run mode 150 with the battery checking routine.

The battery checking routine observes a bit in Port A corresponding to the battery condition. If the battery condition is indicated as acceptable, no further action is taken and program control continues with the next routine in the cycle category. If, however, the battery condition is indicated as unacceptable, the low battery indicator 107 of the display is caused to flash and then the next routine is invoked.

Referring to FIGS. 5 and 6, after the battery checking routine is completed, a colon updating routine is invoked. The colon routine reads the real time clock registers 122 and compares the values therein with a previously stored real time clock value to determine whether one second has passed since the last real time clock value was stored. If one second has passed, the colon routine changes the state of the colon bit in the Port A register 126 thereby signalling the colon driver to turn the colon on the display on or off. For instance, if the colon was previously off, the colon would be turned on. After the expiry of one second, the update colon routine would then shut the colon off and so on. The colon 106 of FIG. 4 thus flashes on and off at the rate of once per second.

Referring back to FIGS. 5 and 6, after the colon routine is completed, a display updating routine is entered. The display routine reads the current value of the parking time clock registers 130 and performs a transfer function which determines appropriate codes for activating the display with appropriate digits. The routine then loads Port A with appropriate values which the digit display drivers interpret to cause the appropriate digits to appear on the display.

After the display routine is completed, a parking time clock decrementing routine is entered. This routine subtracts 1/25th of a second, representing an incremental value, from the current value in the parking time clock registers 130 to produce an updated value. The updated value is then tested to see whether it is equal to zero. If the value is equal to zero, the parking time purchased has expired. At this point, the routine causes flashing zeros to be displayed on the display 20 of FIGS. 1 and 4. The clock decrementing routine thus acts as time subtracting means for subtracting an incremental value from the time clock value at periodic intervals determined by the periodic time reference signal.

Referring back to FIGS. 5 and 6, if the updated value is less than or equal to zero, an optional, negative time routine may be entered. The negative time routine allows a particular grace period to be applied to parking time. For instance, with a grace period of ten minutes, the negative time routine compares the time in the parking time clock registers 130 with the value in the negative time register 144. Should the value in the parking time clock registers be equal to the value in the negative time register minute value, the negative time routine causes flashing zeros to appear on the display thus indicating to a parking enforcement officer the grace period for parking has expired and the vehicle may properly be ticketed. The negative time routine thus acts as means for indicating the expiry of a predefinable grace period, the grace period beginning after the time clock has been decremented to zero.

After performing the above routines, an exit routine is run which places the microprocessor into the low power mode 148. The microprocessor then waits until an interrupt from the counter/timer is received.

At any time during the run mode 150 or the low power mode 148, the microprocessor may receive a communications interrupt from the communications interface 116 of FIG. 10. Upon receiving infra-red energy from the external device 89, the communications interface 116 sends an interrupt signal on the DCD signal line to the microprocessor 88. Referring to FIG. 9 the microprocessor enters the communications category of routines 158 whereupon Port B is placed in the input mode and is read by the CPU. The CPU reads the data appearing at Port B and proceeds to perform various subroutines or functions as defined by the data sent by the external device. After the communications exchange has taken place, a time delay routine ignores further interrupts on the DCD signal line for a period of two seconds. This prevents the microprocessor from being interrupted due to extraneous signals which could potentially be transmitted by the external device after a valid transmission has occurred.

In the preferred embodiment, there are two basic subroutines which may be performed in connection with the external device; in a first, read routine, the contents of the RAM are transmitted via the communications interface 116 of FIG. 4 to the external device 89 and in a second or write subroutine, data received from the external device 89 are stored in the RAM. After either of the above subroutines is completed, the month and day registers of the Z report group of registers 138 of FIG. 5, may be optionally updated with the month and day of the communications exchange as determined from the real time clock registers 122. In addition, the counter register may optionally be incremented to keep track of the number of records produced by the parking meter. This is particularly important to monitoring the security of the meter. If an unauthorized person attempts to communicate with the parking meter the counter register is incremented and will therefore be out of sequence with records previously kept by an authorized user.

To invoke the read routine the external device 89 asynchronously transmits the first signal at 500 Hz to set the receiver circuit 500 of the meter interface 116 into the second frequency receive mode. The external device then transmits the second signal containing a read control code in an FSK format to the receiver. The receiver circuit amplifies the second signal, demodulates it and interrupts the microprocessor 88 using the DCD signal line. Demodulated data representing the control code appears on the RxD signal line and is presented to a bit location of Port B where it is read in serial format by the CPU 90 and assembled into a parallel format (ie. a code byte). The CPU interprets the code byte as a request for information. After this request is received and interpreted, the CPU 90 writes to Port B to set the RTS bit active thereby enabling the transmitter portion of the meter interface. The transmitter portion then transmits a signal at the first frequency to the external device thereby causing the external device to switch to the second frequency receive mode. The CPU then addresses each of the RAM register locations and presents the contents of each register in a serial format to a TxD bit of Port B. The transmitter portion then shifts the second signal between 30 kHz and 40 kHz to indicate marking and spacing conditions reflecting the states of bits appearing at the TxD bit of Port B. The external device thus receives data from the meter. It can readily be seen that the microprocessor acts as a computer programmed to read any of said plurality of registers in response to a request from the communicating means to provide data stored in said registers to the communicating means.

The external device 89 receives the data transmitted by the meter and stores it in its own memory. The external device may then be taken to a personal computer or other such device whereupon the contents of the memory of the external device may be downloaded into the personal computer for analysis. The personal computer may be programmed to provide reports containing statistical information regarding meter usage, most common coin type, total revenue, etc.

To invoke the write subroutine of FIG. 9, the external device 89 of FIG. 4 functions as described in connection with the read routine with the exception that a write control code is transmitted in a FSK format in the second signal. The microprocessor interprets the write control code and waits for data to appear on the bit in Port B representing the state of the RxD signal line. When data appears, the CPU formats the data from a serial form into a parallel form, whereupon the data is assembled into bytes. These bytes are stored in the parameter registers of the RAM and serve to modify the parameters contained in the registers. In this way, the external device can modify the registers of the RAM and thus modify the operating parameters of the meter. Rates, effective times of rates, maximum time intervals, lowest denomination values, or any of the plurality of registers can therefore easily be programmed to any value desired by remote, wireless communication from the external device The microprocessor thus acts as a computer programmed to write to any of said plurality of registers in response to a write request from said communicating means.

ALTERNATIVES

The communications interface system uses infra-red radiation which is selected for regulatory convenience, so as to avoid possible regulatory problems associated with use of radio transmitters, microwave transmitters. etc. The spectrum of infra-red radiation selected for use can present problems in very bright sunshine, and thus caution should be taken to ensure minimal interference with transmission under bright sunshine. Clearly, other types of electromagnetic radiation transmission can be substituted for the infra-red radiation transmission described, and suitable transmitters and receivers can be provided and adapted to be relatively free from interference problems as is well known in the trade. Similarly, ultra-sonic transmission means might be possible in some instances, particularly where large capacity storage batteries can be provided and battery life is of relatively little concern. Clearly, in applications where battery life is of concern, the preferred embodiment utilizing a low frequency transmission for interrupting a low power mode of the receiver, so as to automatically switch the receiver to operate at a higher frequency, which inherently creates a greater power drain from the battery, is preferred where battery power considerations dominate Clearly, the capability of changing the operating parameters and providing meter management information as described herein could be incorporated into other electronic parking meters having money receiving mechanisms different from that described herein.

While a specific embodiment of the invention has been described, such embodiment should be considered illustrative of the invention only and not as limiting the invention as construed in accordance with the accompanying claims.

What is claimed is:

1. A process of data communication, the process including the steps of:
   a) transmitting a first signal having a first frequency for a first period of time and then transmitting a second signal having a second frequency for a second period of time, said second signal being modulated to represent data;
   switching a receiver into a low power mode when no signal is received;
   switching the receiver into a data communication mode when said first signal is received to enable the receiver to receive the second signal and extract data therefrom; and
   switching the receiver back into the low power mode when said second signal is no longer received.

2. An apparatus for communication of data, the apparatus including;
   a) a transmitter operable to transmit a first signal at a first frequency and a second signal at a second frequency, the second signal being modulated to represent data;
   b) a receiver switchable between a first frequency receive mode and a second frequency receive mode, the first frequency receive mode rendering the receiver operable to receive signals at the first frequency and the second frequency receive mode rendering the receiver operable to receive signals at the second frequency, the first frequency receive mode being a low power mode and the second frequency receive mode being a data communication mode;
   c) switching means for switching the receiver into the low power mode, for switching the receiver into the data communication mode when said first signal is received, and for switching the receiver into the low power mode when said second signal is no longer received.

3. An apparatus as claimed in claim 2 wherein the first frequency is less than the second frequency.

4. An apparatus as claimed in claim 3 wherein the receiver includes an amplifier circuit having a gain-bandwidth product responsive to current supplied to the amplifier, the gain being high and bandwidth being low when low current is supplied and the gain being high and the bandwidth being high when high current is supplied.

5. An apparatus as claimed in claim 4 wherein the means for switching includes a level detector connected to the amplifier and a comparator connected to the level detector, the level detector producing a detect signal when the first signal is received, the comparator comparing the detect signal with a reference signal and providing a comparator signal when said detect signal has a greater amplitude than said reference signal.

6. An apparatus as claimed in claim 5 wherein the switching means includes a low power control circuit, the low power control circuit receiving the comparator signal and increasing the current supplied to the amplifier in response to the comparator signal thereby placing the receiver in the data communication mode.

7. An apparatus as claimed in claim 2 wherein the transmitter includes an oscillator for selectively producing the first and second signals at the first and second frequencies respectively.

8. An apparatus as claimed in claim 7 wherein the second signal is modulated with data by frequency shift keying.

9. An apparats as claimed in claim 8 wherein the transmitter includes a frequency shift keying control circuit for causing the oscillator to produce the second signal at said second frequency, said second signal being modulated in a frequency shift keying format by the frequency shift keying control circuit.

10. An apparatus as claimed in claim 9 further including a first capacitor connected to the oscillator, for placing said second signal in a marking condition, a second capacitor connected to the frequency shift keying control circuit and operable to be switched in parallel with the first capacitor to place said second signal in a spacing condition, a low frequency control circuit and a third capacitor connected to the low frequency control circuit and operable to be switched by the low frequency control circuit in parallel with the first capacitor to produce said first frequency.

11. An apparatus as claimed in claim 10 wherein the second and third capacitors have respective resistors in parallel therewith to provide phase coherence when said second or said third capacitor is switched in parallel with said first capacitor, each resistor having a value sufficiently high to maintain said frequencies and sufficiently low to bleed charge rom respective capacitors.

12. An apparatus for receiving data from a transmitter, the apparatus including;
   a) a receiver switchable between a low power mode and a data communications mode, low power mode rendering the receiver operable to receive signals at a first frequency and the data communications mode rendering the receiver operable to receive signals at a second frequency;

b) switching means for switching the receiver into the low power mode when no signal is received, for switching the receiver into the data communication mode when a first signal having said first frequency is received thereby enabling communication to ensue with signals having said second frequency, and for switching the receiver back into the low power mode when transmission of signals having said second frequency is no longer received.

13. An apparatus for transmitting and receiving data to and from a remote device, the apparatus including;
   a) a receiver switchable between a low power mode and a data communications mode, low power mode rendering the receiver operable to receive signals at a first frequency and the data communications mode rendering the receiver operable to receive signals at a second frequency;
   b) transmitting means for transmitting communication signals at said second frequency to said remote device when said receiver is in said data communication mode;
   c) switching means for switching the receiver into the low power mode when no signal is received, for switching the receiver into the data communication mode when a first signal having said first frequency is received thereby enabling communication to ensue with signals having said second frequency, and for switching the receiver back into the low power mode when transmission of signals having said second frequency is no longer received.

14. An apparatus as claimed in claim 13 wherein said transmitting means includes means for transmitting a wake-up signal at said first frequency prior to transmitting said communications signals.

* * * * *